(12) United States Patent
Varadarajan et al.

(10) Patent No.: US 7,895,164 B1
(45) Date of Patent: Feb. 22, 2011

(54) EFFICIENT CHECKPOINT PROCESS

(75) Inventors: Srinidhi Varadarajan, Blacksburg, VA (US); Joseph Ruscio, Blacksburg, VA (US); Michael Heffner, Blacksburg, VA (US)

(73) Assignee: Librato, Inc., Santa Clara, CA (US)

( * ) Notice: Subject to any disclaimer, the term of this patent is extended or adjusted under 35 U.S.C. 154(b) by 803 days.

(21) Appl. No.: 11/724,082

(22) Filed: Mar. 13, 2007

(51) Int. Cl.
*G06F 17/00* (2006.01)
(52) U.S. Cl. ........................ 707/649; 707/756
(58) Field of Classification Search .............. 707/104.1; 370/256
See application file for complete search history.

(56) References Cited

U.S. PATENT DOCUMENTS

2006/0004860 A1* 1/2006 Liedes et al. ............. 707/104.1

2008/0181139 A1* 7/2008 Rangarajan et al. ......... 370/256

OTHER PUBLICATIONS

Brian Demsky, Martin Rinard, "Data Structure Repair Using Goal Directed Reasoning", ACM Journal, Computer Science and Artificial Intelligence Lab, MIT, Cambridge, MA 02139, May 15-21, 2005, pp. 1-10.*
Betty Salzberg, Vassilis Tsotras, "Comparison of Access Methods for Time-Evolving Data", ACM Computin Suveys, vol. 31, No. 2, Jun. 1999, pp. 158-221.*

* cited by examiner

*Primary Examiner*—Shahid A Alam
*Assistant Examiner*—Donald Lawson
(74) *Attorney, Agent, or Firm*—Arent Fox LLP (57) ABSTRACT

Approaches to efficiently creating a checkpoint of the process are described. In one approach, a method of performing a checkpoint operation on a process involves detecting a change in the contents of a memory page associated with the process. This change occurred after a preceding checkpoint operation. The method also involves modifying a data structure, at a location corresponding to the contents of that memory page.

11 Claims, 11 Drawing Sheets

System 112

Dense Data Structure 350

FIG. 3

| | |
|---|---|
| 444<br>*index* | 434<br>*address of page 224* |
| 442<br>*index* | 432<br>*empty* |
| 441<br>*index* | 431<br>*address of page 221* |
| 443<br>*index* | 433<br>*address of page 223* |

File Map 410

Fragmentation Tracking Container 610

FIG. 6

Flowchart 700

FIG. 7

Flowchart 800

FIG. 8

Flowchart 900

Flowchart 1100

FIG. 11

EFFICIENT CHECKPOINT PROCESS

The present invention relates generally to the field of computing. More particularly, embodiments of the present invention relate to a method for organizing data.

BACKGROUND

Within the field of computing, "checkpointing" is a technique used to backup and restore an application or system, often in the event of failure. In many cases, checkpointing involves taking a snapshot of the current system or application state, and storing that data. If necessary, the system or application can be returned to the state it was in when the checkpoint file was created. In some cases, when creating a checkpoint of an application or process, the state of the memory allocated to that application or process essentially defines the state of the application or process. Returning the memory to the checkpointed state restores the application to the state it was in when the checkpoint was created.

When checkpointing a process, a checkpoint system handles application memory at some defined level of granularity. Often, this level of granularity is an operating system (OS) page; for purposes of discussion and illustration, OS pages will be used herein, except as noted. When performing a memory-related activity, such as detecting modified memory contents, writing memory contents to disk during a checkpoint, or reloading memory contents during a restart, memory is managed in segments of one or more memory pages.

Traditional approaches to checkpointing a process, and particularly to incrementally checkpointing a process, suffer a number of drawbacks. For example, fragmentation of a checkpoint file will occur, whenever a memory page that existed during one checkpoint is freed before the next checkpoint. The application which freed the page has no means of returning the corresponding portion of the checkpoint file to a null state, and so that portion of the file becomes an unused fragment.

Another conventional method involves storing the incremental checkpoints as a series of "patches" to the address space. At each checkpoint, the set of pages that has been modified during the preceding interval is recorded serially to disk as a patch. Each page can be stored to disk with an 8-byte offset, which describes where in the process it was located. On a restart, the patches can be applied to a blank address space in the order in which they were recorded.

The runtime complexity associated with this approach is typically low and fragmentation is substantially avoided. However, the amount of disk space required is effectively unbounded in this approach. This is because a page that is modified in every interval is recorded to disk in every interval without removing any of the prior recordings. A worst-case scenario, and one that is not uncommon in high performance computing (HPC), occurs when an application modifies all of its memory during each interval. The disk size required is bounded at $O(n*m)$ where 'n' is the number of pages an application uses and 'm' is the number of checkpoints taken.

The advent of 64 bit computing has only exacerbated these problems, as the increase in available address space leads to much greater potential issues. For example, in a 32 bit computing environment, the total addressable memory was limited to four gigabytes ($2^{30}$ bytes); in a 64 bit addressing scheme, 16 exabytes ($2^{60}$ bytes) are available.

SUMMARY

Approaches to efficiently creating a checkpoint of the process are described. In one approach, a method of performing a checkpoint operation on a process involves detecting a change in the contents of a memory page associated with the process. This change occurred after a preceding checkpoint operation. The method also involves modifying a data structure, at a location corresponding to the contents of that memory page.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments of the invention, examples of which are illustrated in the accompanying drawing figures. While the invention will be described in conjunction with these exemplary embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, one of ordinary skill in the art will realize that embodiments of the present invention may be practiced without these specific details. In other instances, well-known methods, processes, algorithms, procedures, networks, systems, components, and circuits have not been described in detail so as not to unnecessarily obscure aspects of the present invention.

Portions of the detailed description that follows are presented and discussed in terms of processes, e.g., methods. Although blocks and sequencing thereof are disclosed in figures herein (e.g., FIGS. 5 and 6) describing the operations of these processes (e.g., processes 50 and 60, respectively), such blocks and sequencing are exemplary. Embodiments of the present invention are well suited to performing various other blocks or variations of the blocks recited in the flowcharts of the figures herein, and in a sequence other than that depicted and described herein. In one embodiment, such processes are implemented on a computer. In one embodiment, such processes are carried out by processors and electrical and electronic components under the control of computer readable and computer executable instructions comprising code contained in a computer usable medium.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Exemplary Computer System

Figure 1:
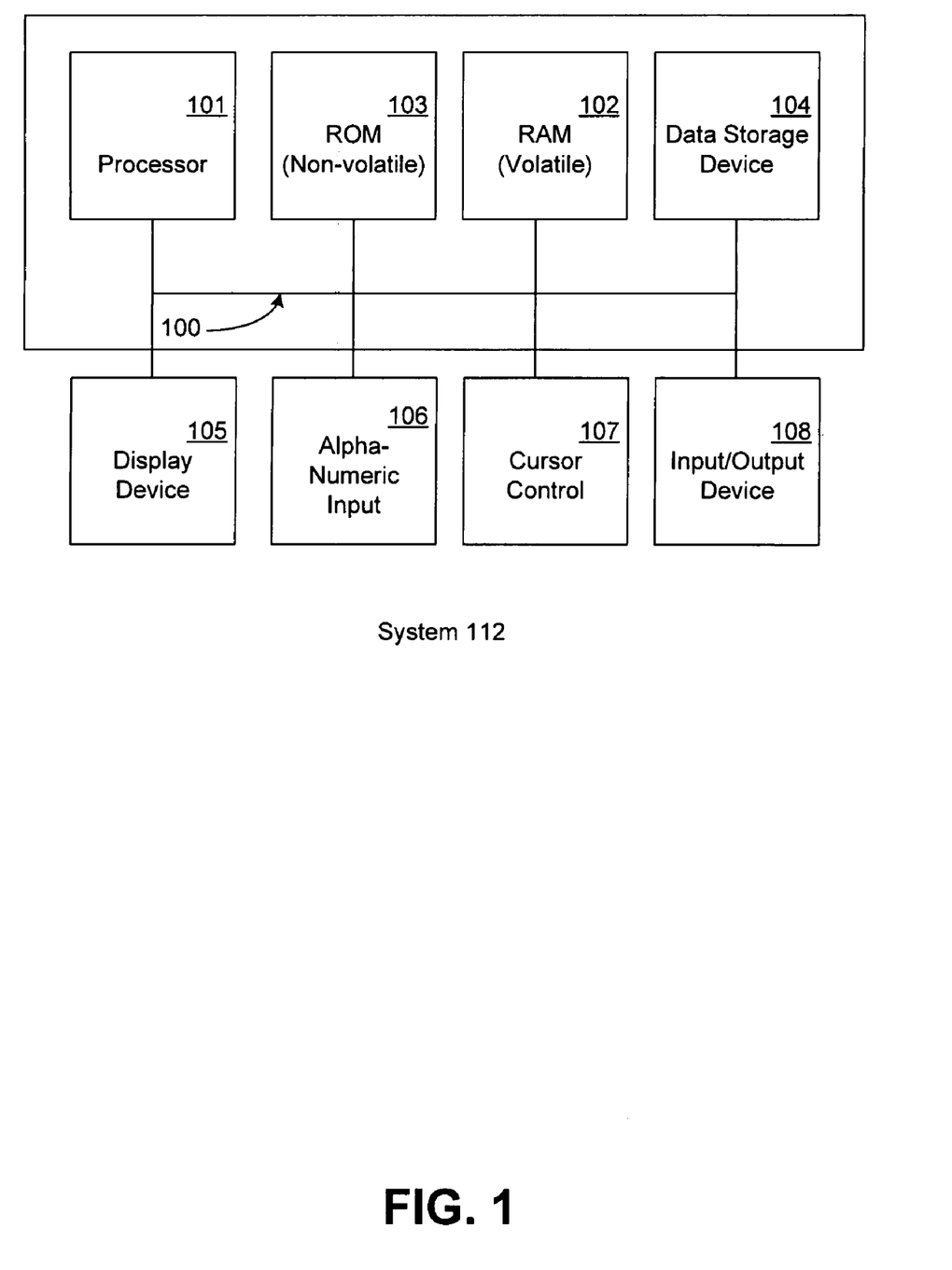
FIG. 1 depicts a block diagram of an exemplary computer system upon which embodiments of the present invention may be implemented.

Referring first to FIG. 1, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention. That is, computer system 112 can include elements other than those described in conjunction with FIG. 1.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet, intranet (e.g., a local area network), wireless network, or wireless mesh network. Input/Output device 108 may also include a Universal Serial Bus (USB) interface for connected peripherals including security peripherals, such as a token device. In one embodiment, a USB "flash memory" device may contain a secret or accept a secret from one device and act as a "courier" to transport that secret to another device. In such an embodiment, the two devices are said to be securely "introduced" for the purposes of establishing a secure association based on the secret from the USB memory.

Efficient Checkpoints

A method for organizing data from a sparsely populated address space into a dense structure is described that includes, in one embodiment, specifying an entry of the data to be added into a dense structure from a sparsely populated address space. A determination is made relating to availability of an opening in the dense structure. The first available opening is marked as in use and its index is used as an insertion index. Where no opening is available, the structure is extended with incrementing an end index associated therewith and the extension result is selected as the insertion index. An identifier associated with the entry is inserted into a map that corresponds to the dense structure at the insertion index. A key value pair corresponding to the entry and the insertion index is inserted into a constant access container.

Therefore, embodiments of the present invention allow for efficiently organizing a checkpoint file associated with checkpointing a process. In one embodiment, determining where in a dense structure a particular page's contents reside is a constant time operation (O(1)). In one embodiment, taking the checkpoint is a linear operation (e.g., O(n) where 'n' is the number of pages modified in the last interval). The checkpoint is stored, in one embodiment, as a contiguous byte stream with forward seeks. In an embodiment wherein forward seeks are used exclusively to store the checkpoint, complex seeking operations are obviated. This has the benefits of reducing disk head spinning, which can pose a significant issue in conventional solutions, and thus minimizing the disk latency component of a checkpoint's overhead, which in conventional solutions can be significant.

Moreover, in one embodiment the checkpoint file size has a theoretical upper bound equivalent to the amount of memory in use by the process at the time of the checkpoint, which reduces the fragmentation that can typify conventional approaches. In practice, an embodiment of the present invention allows an operator to balance fragmentation overhead with the number of pages checkpointed at the next interval. Incremental checkpoints are thus effectuated without limiting the other advantages described above.

In one embodiment, operational modes include adding/deleting pages, taking a checkpoint, and loading a checkpoint. When adding a page to the structure the map is first checked for available holes, if none are found the map is extended for the additional entry. The resulting <address, map index> pair is added to the lookup container. On a deletion the map entry is nulled and the <address, map index> pair removed from the lookup container. The null entry is handled according to which of the policies described above the operator has selected. When taking a checkpoint the file map may be traversed linearly and if a page was modified in the preceding interval its contents are recorded to disk. On a reload, the file map is again traversed linearly and each page in the map is loaded from disk to memory.

Embodiments are well-suited to application across a wide range of scenarios. In some embodiments, where a 64 bit addressing scheme is used for memory, utilization of an embodiment is particularly advantageous, as compared with traditional approaches to checkpointing a process.

Checkpointing a Process

Figure 2:
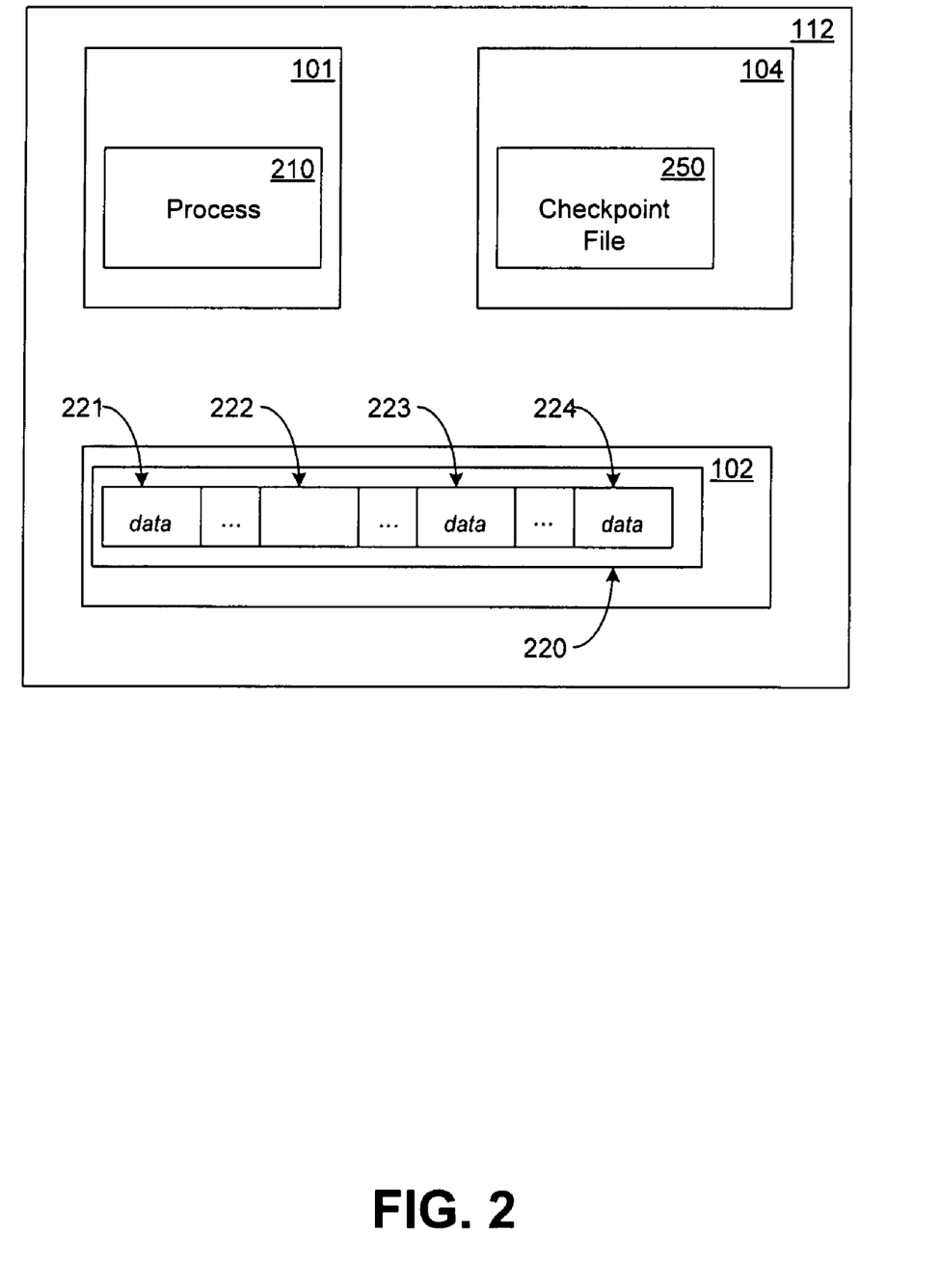
FIG. 2 depicts a block diagram of a computer system and a process to be checkpointed, in accordance with one embodiment.

With reference now to FIG. 2, a block diagram of computer system 112 and a process 210 is shown, in accordance with one embodiment. While computer system 112 is depicted as having specific, enumerated features, it is understood that FIG. 2 is exemplary in nature. In other embodiments, additional, fewer, or different features may be used. Operations performed by one component may be separated into several components, or the function of several components may be consolidated into one, or additional components for features may be added to perform different tasks. In addition, embodiments of the present invention are well-suited to application in networked environments, where information may be passed between multiple computer systems.

FIG. 2 shows a process 210 operating on processor 101. Process 210, as shown, is allocated a portion of RAM 102, specifically allocated RAM 220. Within allocated RAM 220, a number of memory pages are utilized, e.g., pages 221, 222, 223, and 224. As shown in FIG. 2, page 222 is currently empty, while pages 221, 223, and 224 contain data associated with process 210. If process 210 is checkpointed, a checkpoint file 250 is created on data storage device 1.04.

Figure 3:
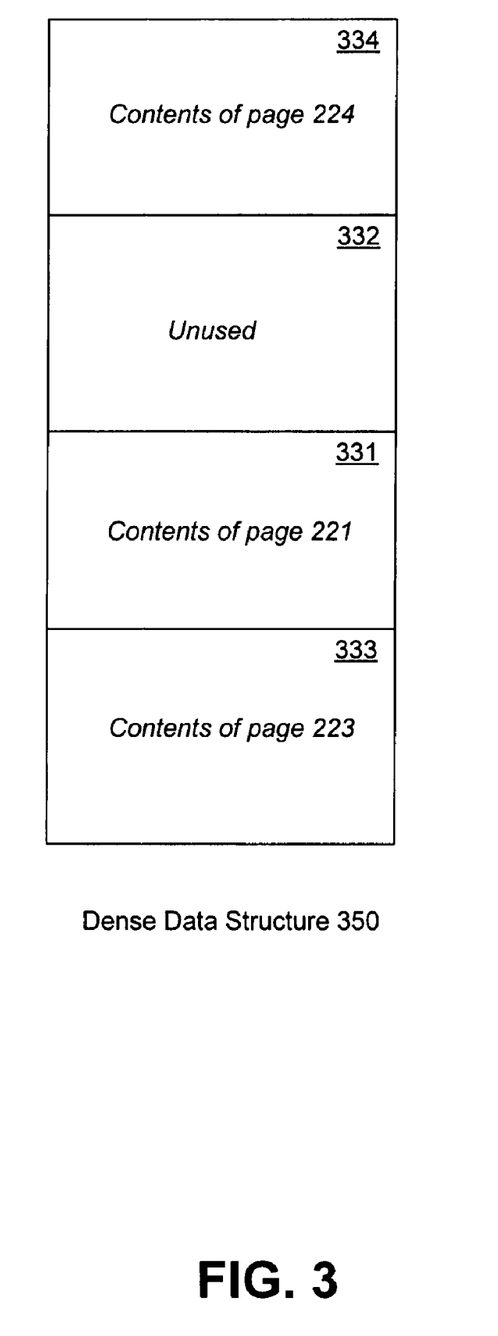
FIG. 3 depicts a representation of a dense data structure, in accordance with one embodiment.

With reference now to FIG. 3, a representation of a dense data structure 350 of a checkpoint file is shown, in accordance with one embodiment. When a process, such as process 210, is checkpointed, the contents of the memory allocated to the process are packed into a data structure. While the allocated memory may only be sparsely populated, in some embodiments, a checkpointing process is more efficient when the contents of the memory can be densely packed.

For example, and with reference to FIG. 2, the contents of pages 221, 223, and 224 of allocated RAM 220 are loaded into dense data structure 350. The contents of page 221 are loaded into position 331; the contents of page 223 are loaded into position 333; and the contents of page 224 are loaded into position 334. In the depicted embodiment, position 332 is currently empty.

File Map

Figure 4:
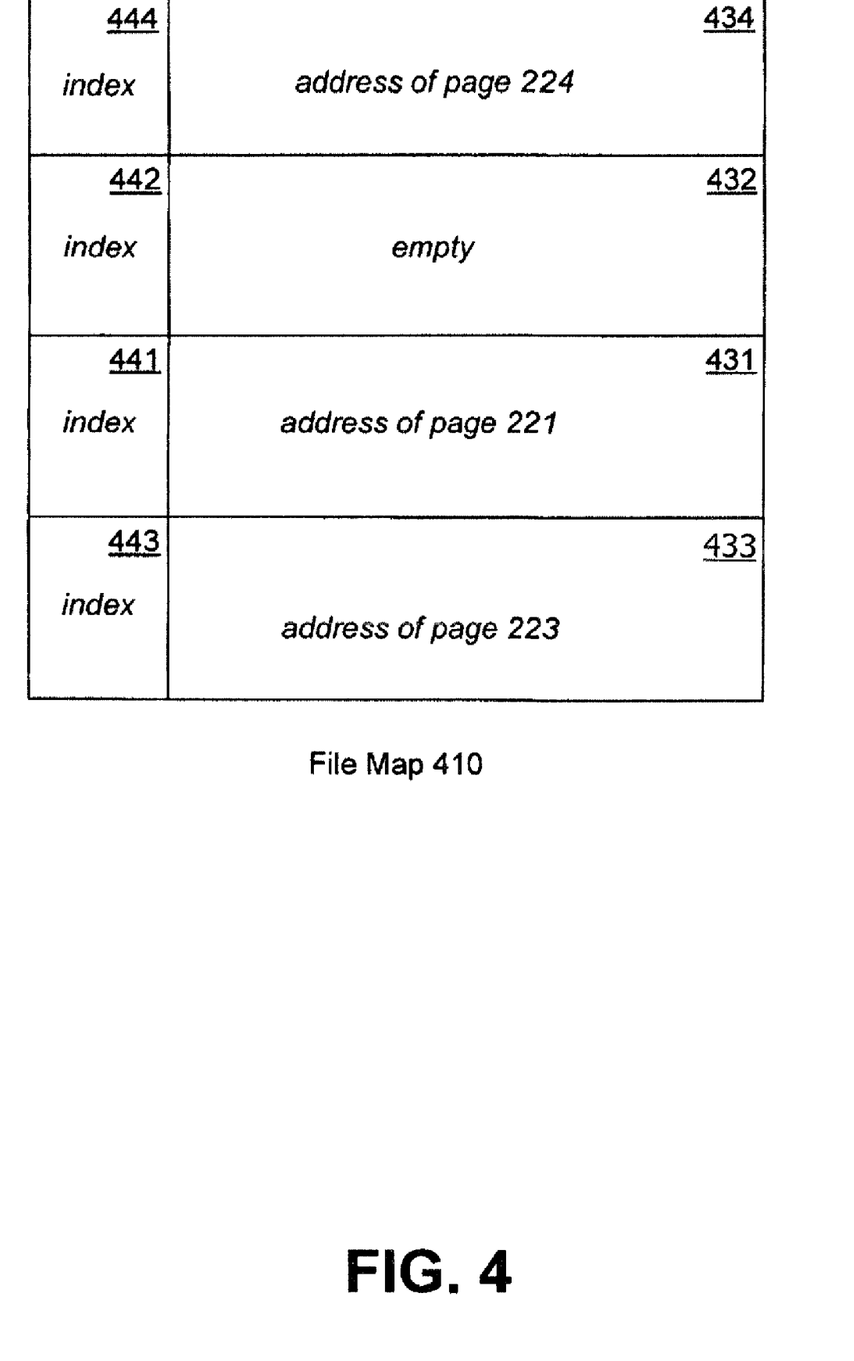
FIG. 4 depicts a file map, in accordance with one embodiment.

With reference now to FIG. 4, a file map 410 is depicted, in accordance with one embodiment. The implementation of file map 410 will vary, across multiple embodiments. In one embodiment, file map 410 is implemented as a data structure, and incorporated into a checkpoint file. In another embodiment, file map 410 is implemented as a separate file. In other embodiments, other implementations are utilized.

File map 410, in the depicted embodiment, is an indexed, linear-access collection of page addresses. Each address corresponds to a page in a process's address space, whose contents are stored in the checkpoint file. In some embodiments, the map ordering is determined solely through the memory access patterns of the process. After each checkpoint operation, the checkpoint file contains the file map, followed by the contents of each page listed, as ordered in the file map. Accessing a page's contents within the checkpoint file can be accomplished by looking up the page address in the file map, and then calculating an appropriate offset in the file, based on the map index associated with that page address.

File map 410, in the depicted embodiment, shows address index pairs for four memory pages. Index 441 is associated with address 431; index 442 is associated with address 432; index 443 is associated with address 433; and index 444 is associated with address 434. In some embodiments, accessing the contents of a particular memory page can be accomplished by first finding the address of the memory page within file map 410, extracting the index associated with that address, and using that index to access a specific portion of the checkpoint file.

For example, and with reference to FIGS. 2 and 3, if the contents of page 221 are desired, searching through file map 410 with the address for page 221 will find address 431. Using index 441, which is associated with address 431, position 331 within dense data structure 350 can be located, and the contents of page 221 extracted.

Looking up at page address directly in the file map, in some embodiments, would require a linear search (O(n)). In some embodiments, in order to reduce map lookup from a linear to a constant time operation (O(1)), a constant access container is utilized.

Constant Access Container

Figure 5:
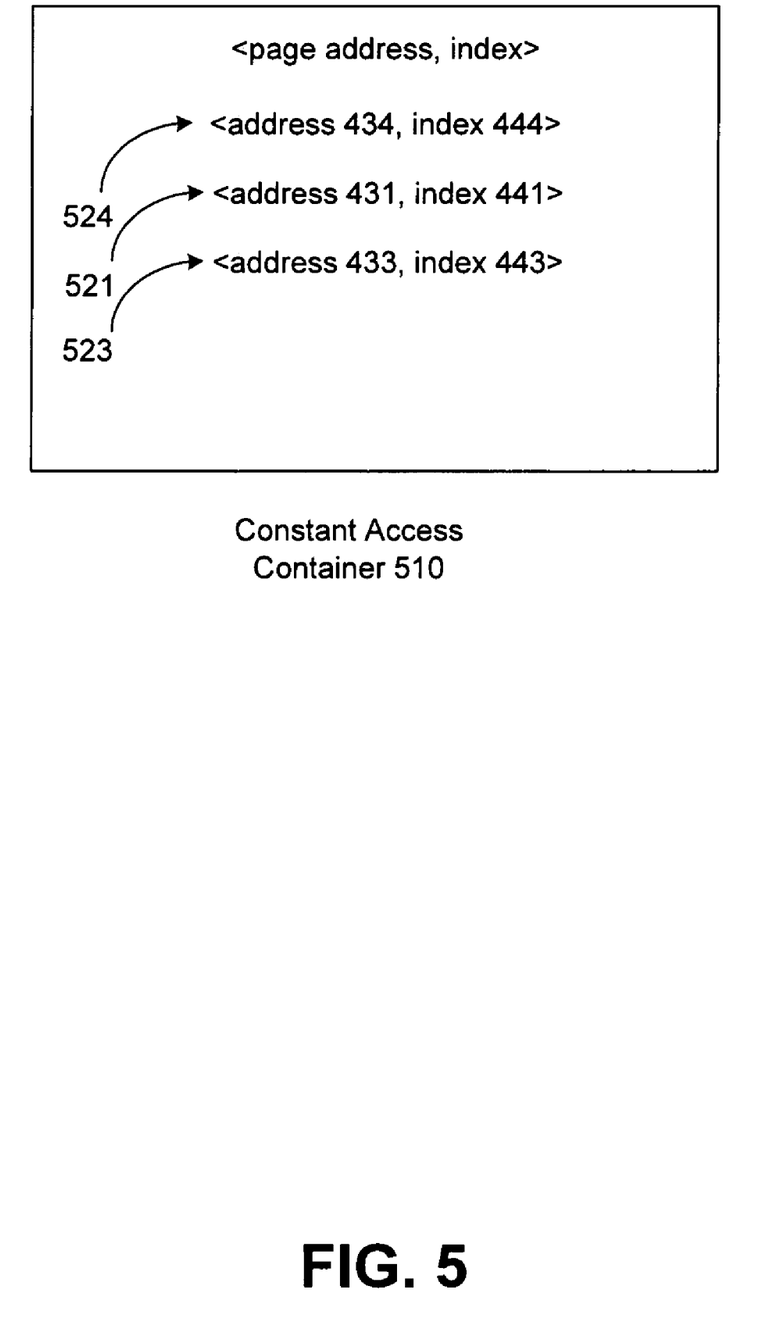
FIG. 5 depicts a constant access container, in accordance with one embodiment

With reference now FIG. 5, a constant access container 510 is depicted, in accordance with one embodiment. While constant access container 510 is described as having specific, enumerated features, it is understood, that in other embodiments, other implementations of constant access container 510 are utilized.

Constant access container 510, in the depicted embodiment, contains key-value pairs, such as pairs 521, 523, and 524. In some embodiments, a page address is used as a key, with the associated index number in a file map as a value. As such, given the page address, the index number associated with that address can be retrieved, via a constant time operation (O(1)).

For example, with reference to FIGS. 2 and 4, given the page address for page 221, that page address can be used as a key to access constant access container 510. That key will access pair 521, and will return the value of the pair, the index. The index value, that is, index 441, relates to file map 410, and indicates where in the file map the address for page 221, that is, address 431, is located.

Fragmentation Tracking

In some embodiments, as memory pages are released by a process being checkpointed, fragmentation may occur. In some embodiments, fragmentation effects can be reduced by tracking which pages are freed, and then reusing those portions of the checkpoint file formerly associated with free pages, to store new data.

In some embodiments, this can be accomplished by removing fragmentation in the file map, and therefore within the dense data structure of the checkpoint file. Whenever a process releases a page back to the OS, there is no longer need to track that page. The freed page is removed from the file map, e.g., by zeroing the corresponding map entry. The position in the dense data structure associated with the cleared map entry is essentially wasted space, or fragmentation.

In some embodiments, a container is used to track index numbers for the file map which point to unused positions within the dense data structure. During checkpointing, when a formerly-used entry in the file map is cleared, the index to that entry is stored in a fragmentation tracking container. In some embodiments, when a new page is to be added to the checkpoint file, a file map index can be extracted from the fragmentation tracking container, and that index will be used for the new page. In such embodiments, a new page will therefore be written over top an existing but unused position within the dense data structure, rather than at the end of the checkpoint file.

Many types of container or data structure are suitable for use as a fragmentation tracking container. In some embodiments, a container with constant time insert and delete operations is utilized, e.g., a last in first out (LIFO) container.

Figure 6:
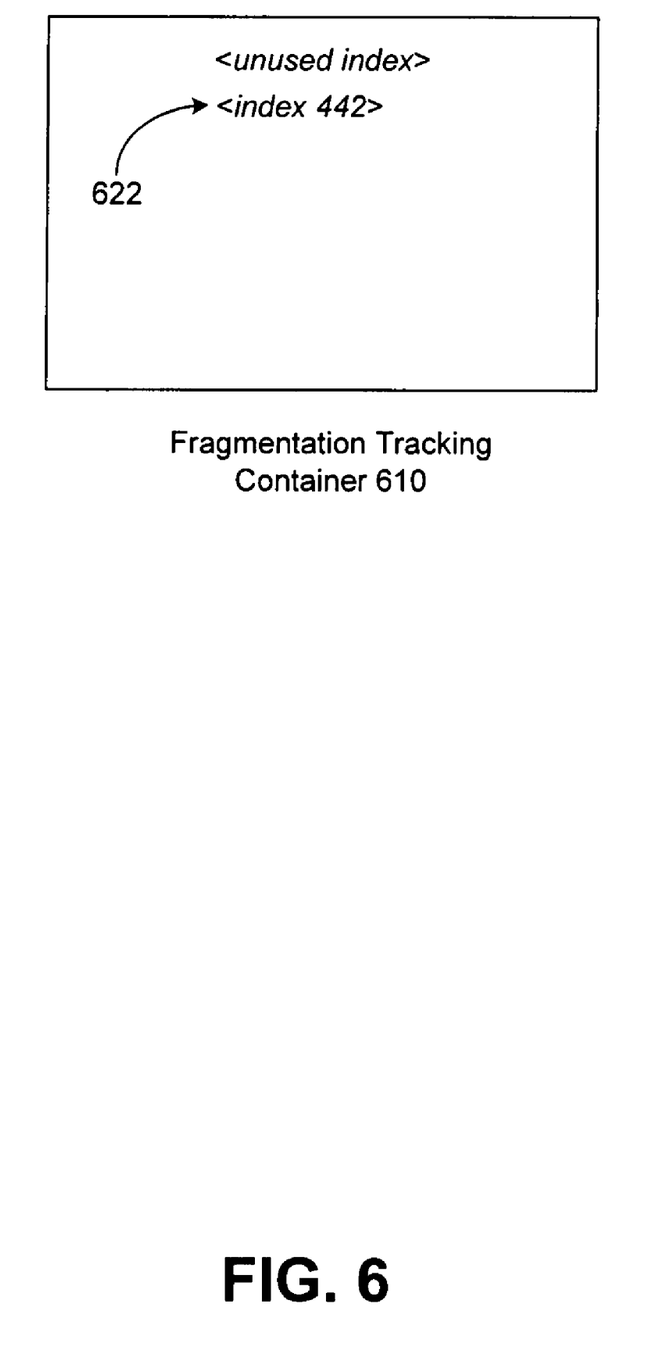
FIG. 6 depicts a fragmentation tracking container, in accordance with one embodiment.

With reference now to FIG. 6, a fragmentation tracking container 610 is depicted, in accordance with one embodiment. Fragmentation tracking container 610 is shown as containing unused index 622. Unused index 622, in some embodiments, corresponds to a file map index number not presently in use, and hence to a portion of a dense data structure currently not in use.

For example, and with reference to FIGS. 3, and 4, unused index 622 corresponds to index 442. As shown in file map 410, address 432 is currently empty, and therefore index 442 points to an unused portion of dense data structure 350, specifically position 332.

In some embodiments, some or all of the preceding containers, including the fragmentation tracking container, the constant access container, the file map, and the dense data structure, are incorporated into a single checkpoint file or data structure. In other embodiments, some or all of these containers are implemented as individual data structures.

Efficient Checkpointing

Figure 7:
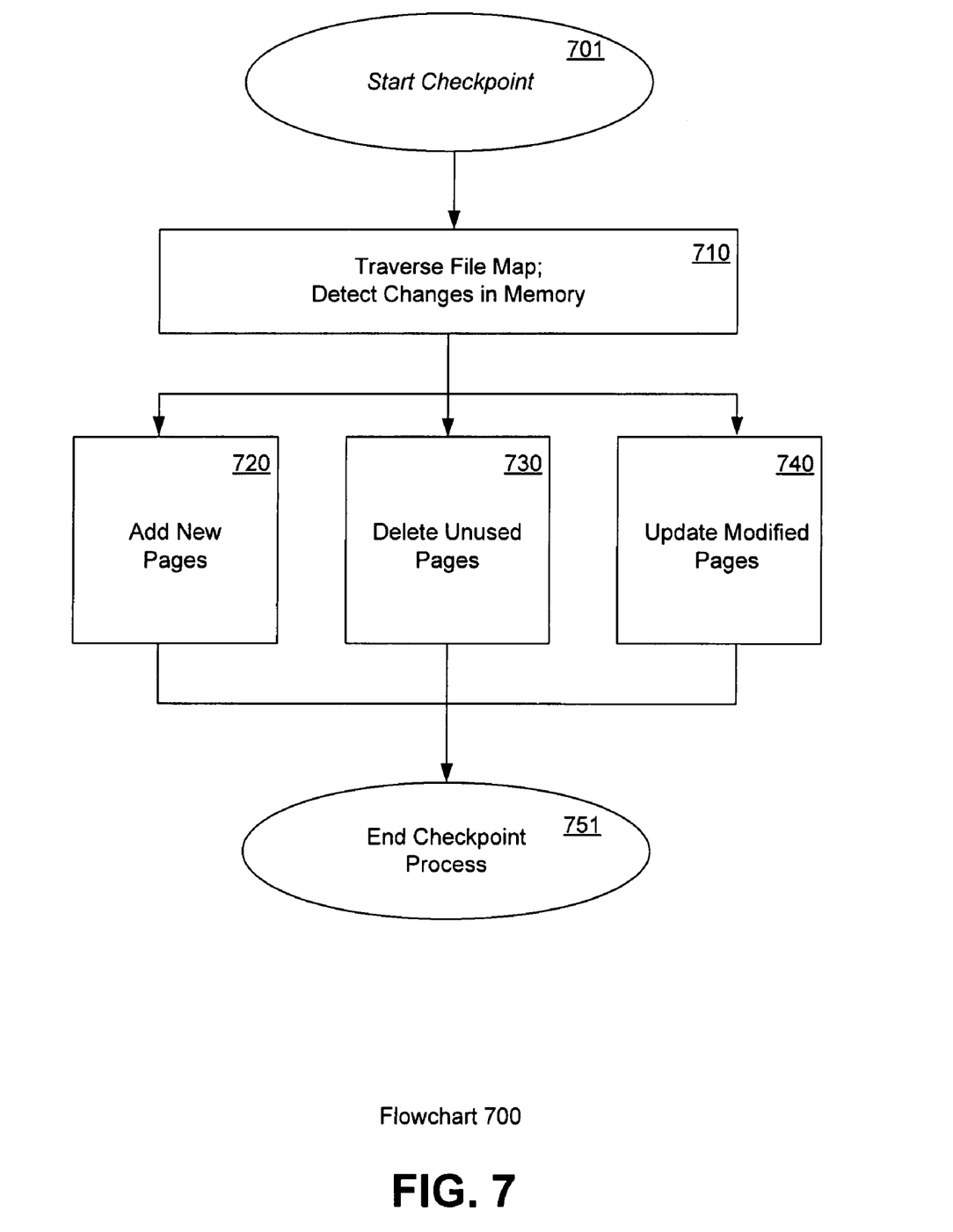
FIG. 7 depicts a flowchart of a method of taking a checkpoint, in accordance with one embodiment.

With reference now to FIG. 7, a flowchart 700 of a method of taking a checkpoint is presented, in accordance with one embodiment. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

With reference to step 701, a checkpointing operation begins. What initiates a checkpointing process will vary, across different embodiments. For example, in some embodiments, checkpointing a process is a user-initiated action. In other embodiments, checkpointing may be an automated process, e.g., after a defined period of time since the last checkpoint. In some embodiments, e.g., virtual computing environments, a process may be checkpointed before it is suspended, to allow the process to be continued at a later time from the current state. In other embodiments, other approaches are utilized.

With reference to FIG. 2 and step 701, for example, process 210 is to be checkpointed.

With reference now to step 710, a file map for a checkpoint file is traversed. In some embodiments, the file map corresponds to the application or process to be checkpointed. In some embodiments, the file map is traversed linearly; in other embodiments, the file map may be traversed in other ways. Some embodiments omit this step. For some embodiments, the file map provides a sequential listing of the contents of the dense data structure of the checkpoint file. Each entry in the file map provides an index number to the dense data structure, which can be used calculate the offset for any specific position within the dense data structure. Each entry in the file map also provides the page address, whose contents are stored at the indicated position. During checkpointing, the contents of each page with its address listed in the file map can be compared with the already existing dense data structure. If the state of the contents has not changed since the last checkpoint, that page can be skipped.

For example, and with reference to FIGS. 2, 3, and 4, file map 410 can be traversed linearly. The first entry, namely index 444 and address 434, corresponds to position 334 of the dense data structure 350, and page 224 of allocated RAM 220. If the contents of page 224 and position 334 are identical, no further action needs to be taken, and a next entry in file map 410 can be processed.

In some embodiments, this step may also include traversing the allocated memory associated with a process to be checkpointed, in such a way as to identify new memory page addresses not currently part of the file. In other embodiments, as new addresses are used by the process, they are added to a separate list or container for reference during the checkpointing operation. In some other embodiments, as new addresses are used by the process, they are appended to the existing file map and dense data structure. In other embodiments, other methods are used.

If, during step 710, some change to the contents of a memory page associated with the process is detected, in some embodiments, three possible actions may follow.

With reference to step 720, if a new page is detected, the memory address for that page, and its contents, are added to the checkpoint file. In some embodiments, this step is performed in accordance with FIG. 8 and flowchart 800, as described below.

With reference to step 730, if a previously existing page is no longer in use, that page's address and contents are deleted from the checkpoint file. In some embodiments, this step is performed in accordance with FIG. 9 and flowchart 900, as described below.

With reference to step 740, if the contents of a previously existing page has been altered since the last checkpoint operation, the checkpoint file is updated to reflect the alteration. In some embodiments, the step involves replacing the entry in the dense data structure, which corresponds to the old page contents, with the current contents of the memory page.

For example, and with reference to FIGS. 2, 3, and 4, if the contents of page 223 has changed since the last checkpoint, the dense data structure 350 needs to be updated. The address of page 223 corresponds to address 433. Address 433 is linked with index 443. Index 443 can be used to access dense data structure 350 at position 333. The contents of page 223 can therefore be written directly into dense data structure 350 at position 333.

With reference now to step 751, after the file map has been completely traversed, the checkpoint operation concludes.

Adding a New Page

Figure 8:
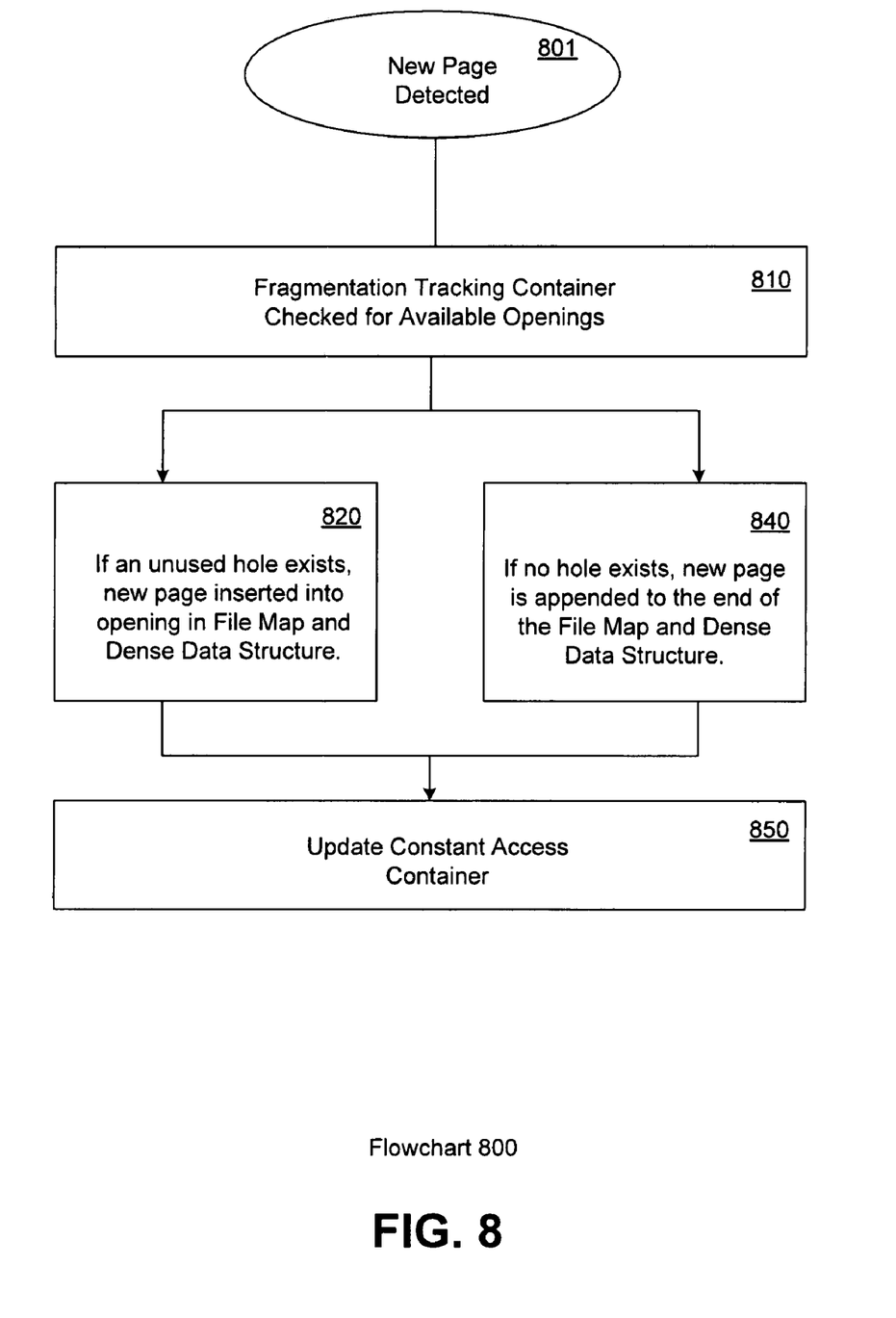
FIG. 8 depicts a flowchart of a method of adding a memory page to a checkpoint file, in accordance with one embodiment.

With reference now to FIG. 8, a flowchart 800 of a method of adding a new page to a checkpoint file is described, in accordance with one embodiment. Although specific steps are disclosed in flowchart 800, such steps are exemplary. That is, embodiments of the present invention are well suited to performing various other (additional) steps or variations of the steps recited in flowchart 800. It is appreciated that the steps in flowchart 800 may be performed in an order different than presented, and that not all of the steps in flowchart 800 may be performed.

In some embodiments, as described above, a new page is added to a checkpoint file during a checkpoint process. In other embodiments, a new page is added to a checkpoint file when it is first used by the process associated with that checkpoint file. In other embodiments, a new page is added to the checkpoint file under other conditions.

With reference now to step 801, the use of a new memory page by the process being checkpointed is detected. For example, with reference to FIG. 2, process 210 has begun using page 222, since the last checkpoint operation.

With reference now to step 810, a fragmentation tracking container is referenced, to determine if any unused holes exist in the dense data structure of the checkpoint file. In embodiments which utilize this step, new memory page usage can be utilized to reduce fragmentation within the dense data structure.

For example, with reference to FIGS. 2, 3, 4 and 6, fragmentation tracking container 610 is referenced, to determine if any holes in dense data structure 350 can be filled with the contents of page 222. Fragmentation tracking container 610 contains unused index 622. Unused index 622 corresponds to index 442 of file map 410. Unused index 622, or index 442, indicates position 332 of dense data structure 350.

With reference now to step 820, if an unused hole exists in the dense data structure, the address for the new memory page is inserted into a file map, and the contents of memory page are inserted into the hole in the dense data structure. In some embodiments, reusing an otherwise "empty" hole in the dense data structure in this matter reduces fragmentation, and aids in reducing necessary storage capacity for the checkpoint file.

In some embodiments, the fragmentation tracking container is updated as part of this step, to indicate that the particular hole is no longer available.

For example, with reference to FIGS. 2, 3, 4, and 6, the address for page 222 is written into file map 410 as address 432. The contents of page 222 are written into dense data structure 350 at position 332. Unused index 622 is removed from fragmentation tracking container 610.

With reference now to step 840, if no holes exist in the dense data structure, the address for the new memory page is appended to the end of the file map, which is incrementally increased in length, and the contents of the memory page are appended to the end of the dense data structure. In some embodiments, where fragmentation controls are not utilized, the step is performed for all new page additions. The file map is increased in length by one entry, to allow the new page address to be added. A new index, in some embodiments incrementally greater than the immediately preceding index, is associated with the new page address. The contents of the memory page are "inserted" into the dense data structure. In some embodiments, this insertion occurs at the end of the dense data structure, in a position corresponding to the new index.

With reference now to step 850, a constant access container is updated, to reflect the address of the new page, and the index associated with it. In embodiments which incorporate a constant access container, such as the constant access container described above with reference to FIG. 5, the address of the new page is used as a key, and the index associated with that new address in the file map is used as a value.

For example, with reference to FIGS. 2, 4, and 5, a new entry is created in constant access container 510. The new entry consists of an address/index pair. The address, address 432, corresponds to the address of the new page, page 222, and is used as a key. The index, index 442, is used as a value. Given address 432, index 442 is returned, e.g., as a constant time operation (O(1)).

Deleting an Unused Page

Figure 9:
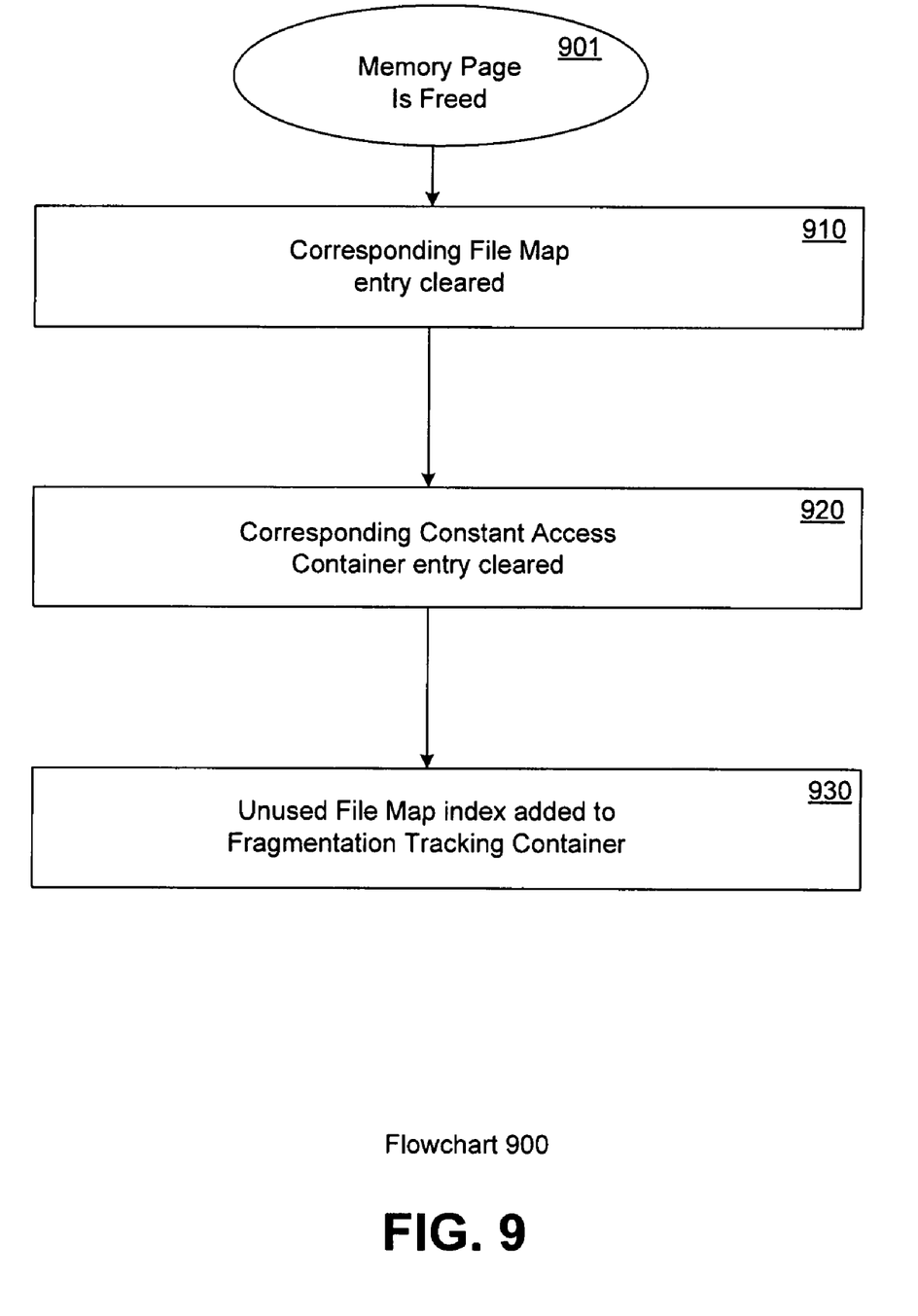
FIG. 9 depicts a flowchart of a method of deleting a memory page from a checkpoint file, in accordance with one embodiment.

With reference now to FIG. 9, a flowchart 900 of a method of deleting an unused page from a checkpoint file is presented, in accordance with one embodiment. Although specific steps are disclosed in flowchart 900, such steps are exemplary. That is, embodiments of the present invention are well suited to performing various other (additional) steps or variations of the steps recited in flowchart 900. It is appreciated that the steps in flowchart 900 may be performed in an order different than presented, and that not all of the steps in flowchart 900 may be performed.

With reference now to step 901, a memory page is freed by a process. In different embodiments, this will occur in response to different actions. For example, with reference to FIG. 2, process 210 may no longer require page 221.

With reference now to step 910, a file map entry corresponding to the now unused page is cleared. The file map, in some embodiments, as described above, links index numbers with memory page addresses, to allow access to specific portions of the dense data structure. When an unused page is removed from the file map, the address portion of the file map entry is cleared, e.g., zeroed out.

For example, when process 210 new longer requires page 221, the file map entry in file map 410 corresponding to page 221, e.g., address 431, can be cleared. As such, while index 441 still indicates position 331 of dense data structure 350, neither index 441 or position 331 are associated with page 221.

With reference now to step 920, an entry in a constant access container associated with the unused page is deleted. As described above, in some embodiments, a constant access container contains key-value pairs, to provide a constant time operation to retrieve any index associated with a page address. When the page is no longer in use, the key-value pair is no longer valid. The entry is removed from the constant access container.

For example, constant access container 510 contains pair 521. Pair 521 is a key-value pair, associating the address for page 221, address 431, with index 441. When page 221 is no longer in use by process 210, pair 521 is deleted from constant access container 510.

With reference now to step 930, the now-unused file map index number is added to a fragmentation tracking container. In some embodiments, fragmentation within the checkpoint file is managed in part through the reuse of portions of the file formerly associated with unused memory pages. When a portion of the dense data structure is no longer used, e.g., because the memory page associated with it is no longer in use, it is available for reuse. By adding the index number associated with that position in the dense data structure to the fragmentation tracking container, a new page can be added at a later time in that position.

For example, index 441, which corresponds to position 331 within dense data structure 350, is added to fragmentation tracking container 610.

Loading a Checkpointed Process

Figure 10:
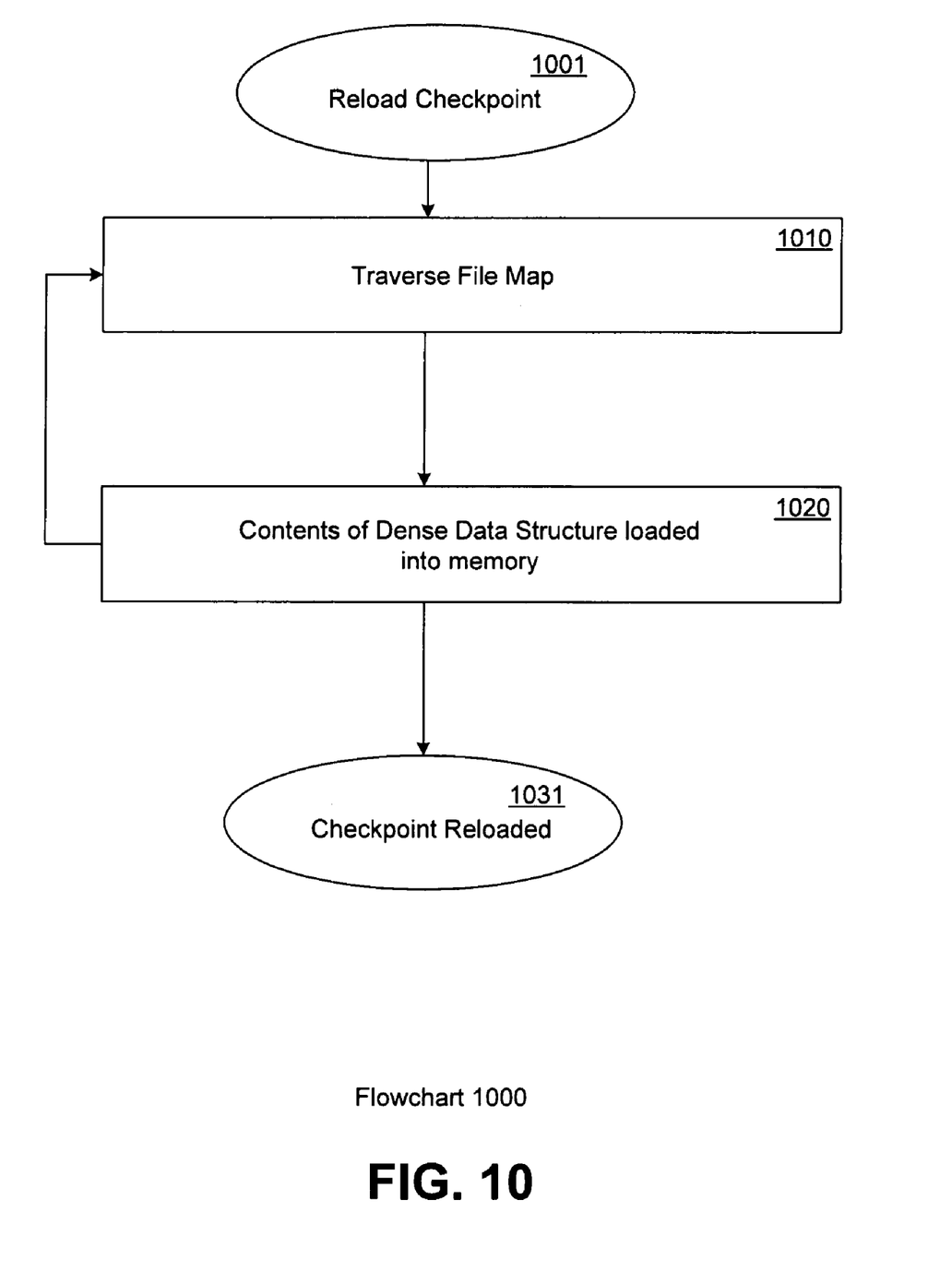
FIG. 10 depicts a flowchart of a method of loading a checkpointed process, in accordance with one embodiment.

With reference now to FIG. 10, a flowchart 1000 of a method of loading a checkpointed process is depicted, in accordance with one embodiment. Although specific steps are disclosed in flowchart 1000, such steps are exemplary. That is, embodiments of the present invention are well suited to performing various other (additional) steps or variations of the steps recited in flowchart 1000. It is appreciated that the steps in flowchart 1000 may be performed in an order different than presented, and that not all of the steps in flowchart 1000 may be performed.

With reference to step 1001, a previously checkpointed process is to be reloaded. In different embodiments, this may result from different actions. For example, in one embodiment, a previously stopped process may be reloaded, at the state it was in when it was stopped.

With reference to step 1010, a file map associated with the checkpointed process is traversed. In some embodiments, the file map is traversed linearly. In other embodiments, different approaches to traversal may be used.

For example, file map 410, associated with process 210, is traversed linearly.

With reference to step 1020, the contents of the dense data structure at a particular index position, are loaded into a memory address, according to the file map. The file map contains entries, where each entry provides an index position within the dense data structure, and a memory page address. The information stored at the index position the dense data structure is to be reloaded into memory at the specified memory page address.

For example, index 444 indicates position 334 within dense data structure 350. The contents of position 334 are to be loaded into allocated RAM 220 at address 434, that is, at page 224.

In some embodiments, steps 1010 and 1020 repeated, until every entry in the file map has been traversed.

With reference now to step 1031, once the file map has been completely traversed, the checkpointed process is completely reloaded.

Fragmentation Management

There are several ways to configure fragmentation management. In one embodiment, fragmentation is substantially prevented. In this embodiment, the last entry in the file map is moved to a hole to fill that hole. This may incur some checkpoint overhead, as a page that was moved in the file map is recorded at the next checkpoint.

In another embodiment, fragmentation is effectively balanced with checkpoint overhead. A fragmentation threshold is set on the number of holes contained in a fragmentation tracking container. As long as the threshold is not exceeded, holes are filled when a new page is added to the dense structure. When the threshold is reached, in the present embodiment holes are filled using the method described above, wherein fragmentation is substantially prevented, until the count drops.

In another embodiment, checkpoint overhead is substantially eliminated. A hole is filled when a new page is added to the structure. Thus, pages that currently exist in the structure are not relocated. This functions to deter pages from being checkpointed without modifications. The bounds on fragmentation are raised to the peak memory usage of the application.

The method of each embodiment in use may be configured through the threshold setting. A threshold of zero effectively calls for the method wherein fragmentation is substantially eliminated. An infinite threshold effectively calls for the method wherein the checkpoint overhead is substantially eliminated.

Figure 11:
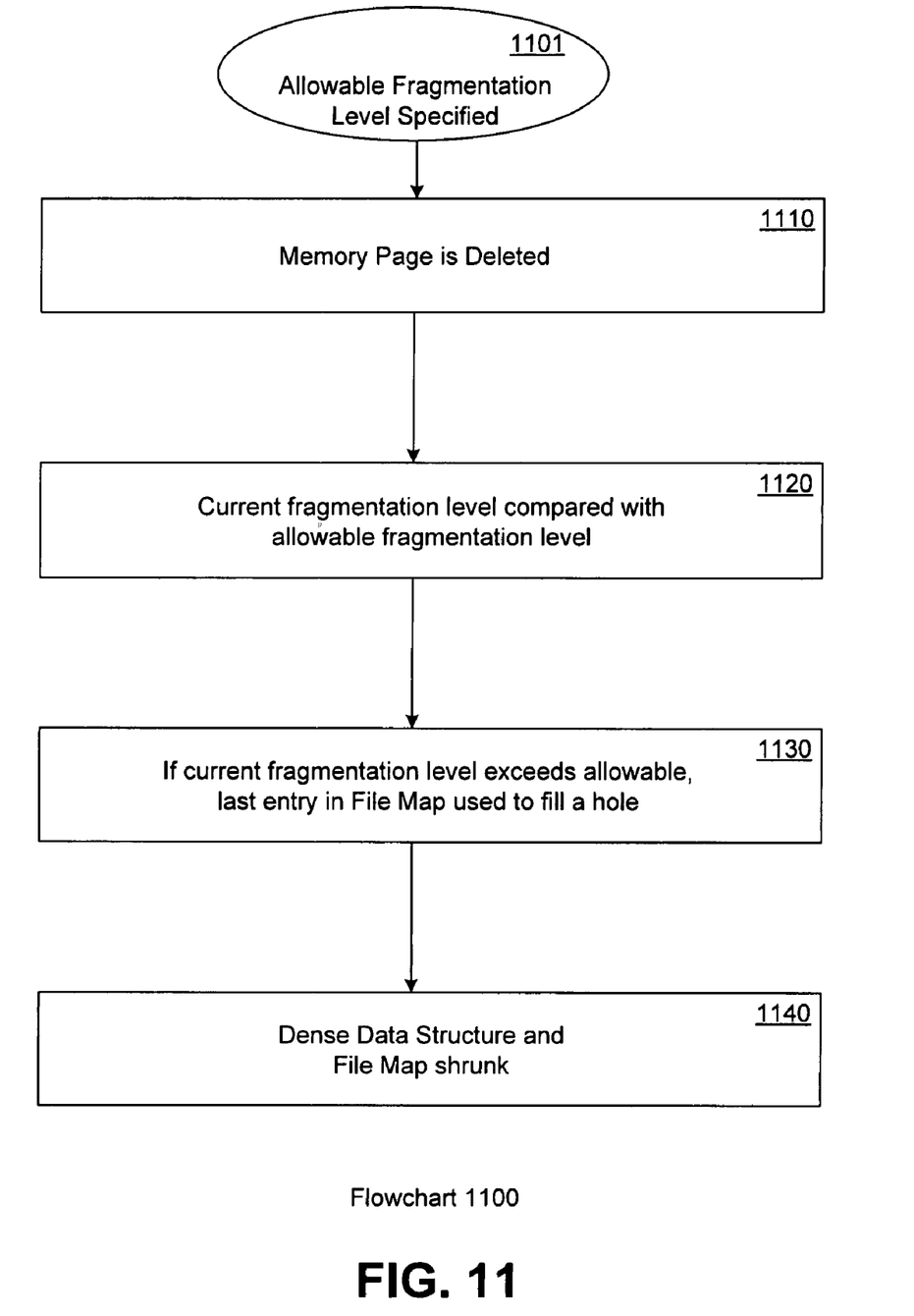
FIG. 11 depicts a flowchart of a method of managing fragmentation withing a checkpoint file, in accordance with one embodiment.

With reference now to FIG. 11, a flowchart 1100 of a method of managing fragmentation within a checkpoint file is depicted, in accordance with one embodiment. Although specific steps are disclosed in flowchart 1100, such steps are exemplary. That is, embodiments of the present invention are well suited to performing various other (additional) steps or variations of the steps recited in flowchart 1100. It is appreciated that the steps in flowchart 1100 may be performed in an order different than presented, and that not all of the steps in flowchart 1100 may be performed.

With reference to step 1101, an allowable fragmentation level is specified. In some embodiments, no fragmentation is allowed. In several such embodiments, the result is similar to setting an allowable fragmentation level of zero. In other embodiments, no fragmentation level is specified. In several such embodiments, the result is similar to setting an allowable fragmentation level of infinity. In different embodiments, this parameter is defined in different ways. For example, in some embodiments, a user may define the allowable fragmentation level. In other embodiments, different methods of defining allowable fragmentation levels are utilized.

With reference to step 1110, a memory page is deleted. In some embodiments, a previously used memory page is no longer used by the process. In some of those embodiments, the association between the memory page address and the stored, outdated contents of that page in the dense data structure is broken. In some embodiments, this may occur following the method described above, with reference to FIG. 9 and flowchart 900.

With reference to step 1120, the current fragmentation level is compared with the defined allowable fragmentation level. In different embodiments, this is performed in different ways. For example, in some embodiments, the number of entries in the fragmentation tracking container is used to determine current fragmentation levels. In other embodiments, different approaches are utilized. In some embodiments, if the page deleted in step 1110 was the last entry in the file map for the checkpointed file, the index to that entry is not added to the fragmentation tracking container; instead, both the file map and the dense data structure are decremented in size.

For example, the number of entries in fragmentation tracking container 610 are compared with the allowable fragmentation level.

With reference to step 1130, if current fragmentation levels exceed the allowable fragmentation levels, the last entry referenced in the file map is moved, and used to fill one of the existing holes. By using the last entry of the file map, as well as the corresponding data stored in the dense data structure, fragmentation within the checkpoint file can be reduced. The entry in the fragmentation tracking container corresponding to the now-filled hole can also be removed.

For example, the final entry in file map 410, as well as the final positioned in dense data structure 350, can be used to fill an empty hole in the checkpoint file. Address 433 can be written to address 432 the contents of position 333, presently associated with index 443, can be rewritten to position 332, associated with index 442. Unused Index 622, in fragmentation tracking container 610, can be deleted. For With reference to step 1140, the dense data structure and the file map can be shrunk, by removing the last entries. After the last entry has been copied to one of the fragmentation holes in the dense data structure, the last entry in the file map, and the last position of the dense data structure, can be cleared or otherwise deleted, to reduce overall space consumption.

For example, position 333 can be deleted from dense data structure 350, and index 443 and address 433 can be deleted from file map 410.

In some embodiments, steps 1120, 1130, and 1140 are repeated, until current fragmentation levels fall below the allowable fragmentation level.

Embodiments of the present invention are thus described. While the present invention has been described in particular embodiments, it should be appreciated that the present invention should not be construed as limited by such embodiments, but rather construed according to the following claims.

What is claimed is:

1. A method of performing a checkpoint operation on a process, comprising:
   determining that contents of a checkpoint data structure in a checkpoint file differ from contents of a process data structure associated with the process, wherein a preceding checkpoint operation stored the contents of the checkpoint data structure in the checkpoint file to create a preceding checkpoint of the process data structure, and wherein the determining that the contents of the checkpoint data structure in the checkpoint file differ from the contents of the process data structure comprises determining that a memory page has been added to the process data structure since the preceding checkpoint operation;
   modifying the contents of the checkpoint data structure in the checkpoint file to reflect the contents of the process data structure;
   referencing a fragmentation tracking container to determine if an opening in the checkpoint data structure is available, wherein the modifying of the contents of the checkpoint data structure in the checkpoint file comprises loading the contents of the memory page into the opening in the checkpoint data structure in the checkpoint file if the opening is available, and wherein the modifying of the contents of the checkpoint data structure in the checkpoint file comprises appending the contents of the memory page to the end of the checkpoint data structure in the checkpoint file if the opening is unavailable; and
   adding an address entry corresponding to the memory page of the process data structure to a file map, wherein the file map comprises a plurality of index/address pairs comprising an address of a memory page of the process data structure and an index pointing to the contents of the memory page stored in the checkpoint data structure, and wherein the address entry added to the file map is in one of the index/address pairs.

2. The method of claim 1, wherein the fragmentation tracking container is configured to track indexes that point to available openings in the checkpoint data structure.

3. The method of claim 1, wherein the determining that the contents of the checkpoint data structure in the checkpoint file differ from the contents of the process data structure further comprises:
   for each of the plurality of index/address pairs, comparing the contents of the data structure at a location corresponding to the index value to the contents of the process data structure at a location corresponding to the address.

4. The method of claim 1, further comprising adding an entry to a constant access container, the entry in the constant access container corresponding to the added address entry in the file map,
   wherein the constant access container comprises a plurality of key-value pairs corresponding to the file map, wherein an address of the index/address pairs is utilized as a key to access the constant access container, and a value paired with the key is the index of the corresponding index/address pair.

5. The method of claim 1, further comprising updating the fragmentation tracking container to indicate that the opening is no longer available.

6. A method of performing a checkpoint operation on a process, comprising:
   determining that contents of a checkpoint data structure in a checkpoint file differ from contents of a process data structure associated with the process, wherein a preceding checkpoint operation stored the contents of the checkpoint data structure in the checkpoint file to create a preceding checkpoint of the process data structure, and wherein the determining that the contents of the checkpoint data structure in the checkpoint file differ from the contents of the process data structure comprises determining that a memory page has been deleted from the process data structure since the preceding checkpoint operation;
   modifying the contents of the checkpoint data structure in the checkpoint file to reflect the contents of the process data structure;
   clearing an address entry in a file map, the address entry containing the address of the memory page that has been deleted from the process data structure,
   wherein the file map comprises a plurality of index/address pairs comprising an address of a memory page of the process data structure and an index pointing to the contents of the memory page stored in the checkpoint data structure, and
   wherein the address entry in the file map is in one of the index/address pairs.

7. The method of claim 6, further comprising:
   adding an index value to a fragmentation tracking container, the index value corresponding to the location in the checkpoint data structure of the contents of the memory page deleted from the process data structure.

8. The method of claim 6, further comprising clearing an entry in a constant access container, the entry in the constant access container corresponding to the cleared address entry in the file map,     wherein the constant access container comprises a plurality of key-value pairs corresponding to the file map, wherein an address of the index/address pairs is utilized as a key to access the constant access container, and a value paired with the key is the index of the corresponding index/address pair.

9. The method of claim 6, wherein the determining that the contents of the checkpoint data structure in the checkpoint file differ from the contents of the process data structure further comprises:

for each of the plurality of index/address pairs, comparing the contents of the data structure at a location corresponding to the index value to the contents of the process data structure at a location corresponding to the address.

10. A method of performing a checkpoint operation on a process, comprising:

determining that contents of a checkpoint data structure in a checkpoint file differ from contents of a process data structure associated with the process, wherein a preceding checkpoint operation stored the contents of the checkpoint data structure in the checkpoint file to create a preceding checkpoint of the process data structure, and wherein the determining that the contents of the checkpoint data structure in the checkpoint file differ from the contents of the process data structure comprises determining that the contents of a memory page of the process data structure have been altered;

modifying the contents of the checkpoint data structure in the checkpoint file to reflect the contents of the process data structure, wherein the modifying of the contents of the checkpoint data structure in the checkpoint file comprises:

accessing a file map comprising a plurality of index/address pairs, each of the pairs comprising an address of a memory page of the process data structure and an index pointing to the contents of the memory page stored in the checkpoint data structure;

retrieving an index value in accordance with its associated address in the file map, the associated address corresponding to the memory page of the process data structure; and         replacing a portion of the checkpoint data structure at a location corresponding to the index value.

11. The method of claim 10, wherein the determining that the contents of the checkpoint data structure in the checkpoint file differ from the contents of the process data structure further comprises:

for each of the plurality of index/address pairs, comparing the contents of the data structure at a location corresponding to the index value to the contents of the process data structure at a location corresponding to the address.

\* \* \* \* \*